United States Patent
Wortmann et al.

(10) Patent No.: US 10,011,754 B2
(45) Date of Patent: Jul. 3, 2018

(54) METHOD OF IMPROVING NITRATE SALT COMPOSITIONS BY MEANS OF NITRIC ACID FOR USE AS HEAT TRANSFER MEDIUM OR HEAT STORAGE MEDIUM

(71) Applicant: BASF SE, Ludwigshafen (DE)

(72) Inventors: Jürgen Wortmann, Limburgerhof (DE); Michael Lutz, Speyer (DE); Johan ter Maat, Mannheim (DE); Kerstin Schierle-Arndt, Zwingenberg (DE); Stephan Maurer, Neustadt (DE); Michael Ladenberger, Darstein (DE); Florian Garlichs, Neustadt (DE); Katharina Kaleta, Heidelberg (DE)

(73) Assignee: BASF SE, Ludwigshafen am Rhein (DE)

( * ) Notice: Subject to any disclaimer, the term of this patent is extended or adjusted under 35 U.S.C. 154(b) by 227 days.

(21) Appl. No.: 14/161,764

(22) Filed: Jan. 23, 2014

(65) Prior Publication Data
US 2014/0202153 A1    Jul. 24, 2014

Related U.S. Application Data

(60) Provisional application No. 61/755,476, filed on Jan. 23, 2013.

(51) Int. Cl.
*C09K 5/12* (2006.01)
*F28D 20/00* (2006.01)
*F24J 2/46* (2006.01)

(52) U.S. Cl.
CPC ............ *C09K 5/12* (2013.01); *F24J 2/4649* (2013.01); *F28D 2020/0047* (2013.01); *Y02E 10/40* (2013.01)

(58) Field of Classification Search
CPC .... F28D 2020/0047; F24J 2/4649; C09K 5/12
(Continued)

(56) References Cited

U.S. PATENT DOCUMENTS 2,013,984 A  *  9/1935  Gross .................. C01B 21/46
                                                    423/395
2,375,761 A     5/1945  Bates
(Continued)

FOREIGN PATENT DOCUMENTS

GB           545590 A      6/1942

OTHER PUBLICATIONS

14161764_20160531_Reaction of Nitric Acid with Alkali Metal Chlorides in Fused Salt Solution—Haug (Haug et al).*
(Continued)

*Primary Examiner* — Phutthiwat Wongwian
*Assistant Examiner* — Jessica Kebea
(74) *Attorney, Agent, or Firm* — Drinker Biddle & Reath LLP (57) ABSTRACT

Method of maintaining or widening the long-term operating temperature range of a heat transfer medium and/or heat storage medium comprising a nitrate salt composition selected from the group consisting of alkali metal nitrate and alkaline earth metal nitrate and optionally alkali metal nitrite and alkaline earth metal nitrite, wherein the nitrate salt composition is brought into contact with an additive comprising the components nitric acid and/or nitrous acid and oxygen-comprising gas having an oxygen partial pressure which is equal to or greater than that in air and/or oxygen-generating compounds and optionally nitrogen oxides and/or compounds which generate further nitrogen oxide.

14 Claims, 1 Drawing Sheet

(58) Field of Classification Search
USPC .............................. 252/71–79; 164/104.15; 60/641.8–641.15
See application file for complete search history.

(56) References Cited

U.S. PATENT DOCUMENTS

| | | | | |
|---|---|---|---|---|
| 3,208,820 | A * | 9/1965 | Forderreuther | C01G 5/00 423/25 |
| 3,436,268 | A * | 4/1969 | Satterfield | H01M 8/22 429/500 |
| 4,340,578 | A | 7/1982 | Erickson | |
| 4,421,662 | A * | 12/1983 | Fiorucci | C01D 9/16 252/70 |
| 4,448,611 | A | 5/1984 | Grellet et al. | |
| 4,529,577 | A | 7/1985 | Chen et al. | |
| 4,534,794 | A | 8/1985 | Walter et al. | |
| 4,559,993 | A | 12/1985 | Picard | |
| 4,574,075 | A * | 3/1986 | Rickly | C01D 9/16 423/184 |
| 4,689,209 | A * | 8/1987 | Pennington | C01B 21/22 423/395 |
| 5,035,769 | A | 7/1991 | Stout | |
| 5,514,226 | A | 5/1996 | Terrat et al. | |
| 5,576,066 | A | 11/1996 | Polti | |
| 6,676,912 | B1 * | 1/2004 | Cooper | B01D 53/56 423/235 |
| 7,296,410 | B2 * | 11/2007 | Litwin | F03G 6/065 60/641.12 |
| 7,588,694 | B1 * | 9/2009 | Bradshaw | C01B 21/48 252/67 |
| 9,133,382 | B2 * | 9/2015 | Wortmann | C09K 5/12 |
| 9,133,383 | B2 * | 9/2015 | Lazzari | C09K 5/12 |
| 2002/0036029 | A1 * | 3/2002 | Kikugawa | H01F 41/026 148/101 |
| 2010/0038581 | A1 | 2/2010 | Gladen et al. | |
| 2012/0056125 | A1 * | 3/2012 | Raade | C09K 5/12 252/71 |
| 2013/0180519 | A1 * | 7/2013 | Groppel | C01D 3/02 126/679 |
| 2013/0264514 | A1 | 10/2013 | Wortmann et al. | |
| 2013/0284970 | A1 * | 10/2013 | Groppel | C09K 5/12 252/71 |
| 2014/0047837 | A1 | 2/2014 | Wortmann et al. | |
| 2014/0049052 | A1 | 2/2014 | Wortmann et al. | |

OTHER PUBLICATIONS

14161764_20160531_Hydrogen Peroxide—Wiki Mar. 2011.*
Alexander, J., et al., "Phase Relations in Heat Transfer Salt Systems", Industrial and Engineering Chemistry, vol. 39, (1947). pp. 1044-1049.
Bauer, T., et al., "Overview of Molten Salt Storage Systems and Material Development for Solar Thermal Power Plants", World Renewable Energy Forum WREF, vol. 2 (2012), pp. 837-844.
Olivares, R., "The thermal stability of molten nitrite/nitrates salt for solar thermal energy storage in different atmospheres", Solar Energy, vol. 86, (2012), pp. 2576-2583.
Hitec® Solar Salt, Technical Brochure, sent by Examiner in U.S. Appl. No. 13/859,799 and obtained by Examiner from wayback machine (web. Archive.org) of www.coastalchem.com/process-literalture-files.html capture of Mar. 6, 2011.

* cited by examiner

METHOD OF IMPROVING NITRATE SALT COMPOSITIONS BY MEANS OF NITRIC ACID FOR USE AS HEAT TRANSFER MEDIUM OR HEAT STORAGE MEDIUM

CROSS-REFERENCE TO RELATED APPLICATIONS

This application claims benefit (under 35 USC 119(e)) of U.S. Provisional Application Ser. No. 61/755,476, filed Jan. 23, 2013, which is incorporated herein by reference in its entirety.

BACKGROUND OF THE INVENTION

The present invention relates to a method of maintaining or widening the long-term operating temperature range of a heat transfer medium and/or heat storage medium as defined in the claims, a corresponding process system as defined in the claims, the use of an additive for maintaining or widening the long-term operating temperature range of a heat transfer medium and/or heat storage medium as defined in the claims and also a method of generating electric energy in a solar thermal power station as defined in the claims.

Heat transfer media or heat storage media based on inorganic solids, in particular salts, are known both in chemical technology and in power station technology. They are generally used at high temperatures, for example above 100° C., thus above the boiling point of water at atmospheric pressure.

For example, salt bath reactors are used at temperatures of from about 200 to 500° C. in chemical plants for the industrial production of various chemicals.

Heat transfer media are media which are heated by an energy source, for example the sun in solar thermal power stations, and transport the heat comprised therein over a particular distance. They can then transfer this heat to another medium, for example water or a gas, preferably via heat exchangers, with this other medium then being able, for example, to drive a turbine. Heat transfer media can also be used in chemical process technology to heat or cool reactors (for example salt bath reactors) to the desired temperature.

However, heat transfer media can also transfer the heat comprised therein to another medium (for example a salt melt) present in a reservoir and thus pass on the heat for storage. However, heat transfer media can themselves also be introduced into a reservoir and remain there. They are then themselves both heat transfer media and heat storage media.

Heat stores comprise heat storage media, usually materials compositions, for example the mixtures according to the invention, which can store heat for a particular time. Heat stores for fluid, preferably liquid, heat storage media are usually formed by a solid vessel which is preferably insulated against loss of heat.

A still relatively recent field of application for heat transfer media or heat storage media are solar thermal power stations for generating electric energy.

Figure 1:
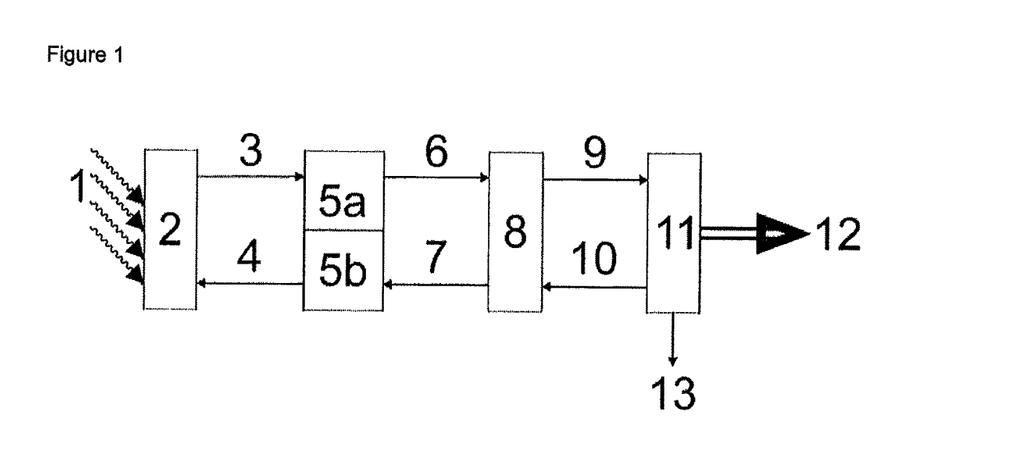
FIG. 1 shows an example of a solar thermal power station schematically.

An example of a solar thermal power station is shown schematically in FIG. 1.

In FIG. 1, the numerals have the following meanings:
1 Incoming solar radiation
2 Receiver
3 Stream of a heated heat transfer medium
4 Stream of a cold heat transfer medium
5a Hot part of a heat storage system
5b Cold part of a heat storage system
6 Stream of a hot heat transfer medium from the heat storage system
7 Stream of a cooled heat transfer medium into the heat storage system
8 Heat exchanger (heat transfer medium/steam)
9 Steam stream
10 Condensate stream
11 Turbine with generator and cooling system
12 Current of electric energy
13 Waste heat In a solar thermal power station, focused solar radiation (1) heats a heat transfer medium, usually in a receiver system (2) which usually comprises a combination of tubular "receivers". The heat transfer medium generally flows, usually driven by pumps, firstly into a heat storage system (5a), flows from there via line (6) on to a heat exchanger (8) where it gives off its heat to water and thus generates steam (9) which drives a turbine (11) which finally, as in a conventional electric power station, drives a generator for generating electric energy. In the generation of electric energy (12), the steam loses heat (13) and then generally flows back as condensate (10) into the heat exchanger (8). The cooled heat transfer medium generally flows from the heat exchanger (8) back via the cold region (5b) of a heat storage system to the receiver system (2) in which it is reheated by solar radiation and a circuit is formed.

The storage system can comprise a hot tank (5a) and a cold tank (5b), for example as two separate vessels.

An alternative construction of a suitable storage system is, for example, a layer store having a hot region (5a) and a cold region (5b), for example in a vessel.

Further details regarding solar thermal power stations are described, for example, in Bild der Wissenschaft, 3, 2009, pages 82 to 99, and also below.

Three types of solar thermal power stations are particularly important at present:
the parabolic trough power station, the Fresnel power station and the tower power station.

In the parabolic trough power station, the solar radiation is focused via parabolic mirror troughs on the focal line of the mirrors. There, there is a tube (usually referred to as "receiver") filled with a heat transfer medium. The heat transfer medium is heated by the solar radiation and flows to the heat exchanger where, as described above, it transfers its heat for steam generation. The parabolic trough-tube system can reach a length of over 100 kilometers in present-day solar thermal power stations.

In the Fresnel power station, the solar radiation is focused onto a focal line by generally flat mirrors. At the focal line there is a tube (usually referred to as "receiver") through which a heat transfer medium flows. In contrast to the parabolic trough power station, the mirror and the tube are not moved together to follow the position of the sun, but instead the setting of the mirrors is offered relative to the fixed tube. The setting of the mirrors follows the position of the sun so that the fixed tube is always located on the focal line of the mirrors. In Fresnel power stations, too, molten salt can be used as heat transfer medium. Salt Fresnel power stations are at present largely still in development. Steam generation or the generation of electric energy in the salt Fresnel power station occurs in a manner analogous to the parabolic trough power station.

In the case of the solar thermal tower power station (hereinafter also referred to as tower power station), a tower is encircled by mirrors, in the technical field also referred to as "heliostats", which radiate the solar radiation in a focused manner onto a central receiver in the upper part of the tower.

In the receiver, which is usually made up of bundles of tubes, a heat transfer medium is heated and this produces, via heat exchangers, steam for generating electric energy in a manner analogous to the parabolic trough power station or Fresnel power station.

Heat transfer media or heat storage media based on inorganic salts have been known for a long time. They are usually used at high temperatures at which water is gaseous, i.e. usually at 100° C. and more.

Known heat transfer media or heat storage media which can be used at relatively high temperatures are compositions comprising alkali metal nitrates and/or alkaline earth metal nitrates, optionally in admixture with alkali metal nitrites and/or alkaline earth metal nitrites.

Examples are the products of Coastal Chemical Company LLC Hitec® Solar Salt (potassium nitrate:sodium nitrate 40% by weight:60% by weight), Hitec® (eutectic mixture of potassium nitrate, sodium nitrate and sodium nitrite).

The nitrate salt mixtures or the mixtures of nitrate and nitrite salts can be used at relatively high long-term operating temperatures without decomposing.

In principle, such mixtures which have a relatively low melting point or relatively high decomposition temperatures can be produced by the combination of nitrate salts, usually those of the alkali metals lithium, sodium, potassium, optionally together with nitrite salts, usually those of the alkali metals lithium, sodium, potassium or of the alkaline earth metal calcium.

In the following, the term alkali metal refers to lithium, sodium, potassium, rubidium, cesium, preferably lithium, sodium, potassium, particularly preferably sodium, potassium, unless expressly indicated otherwise.

In the following, the term alkaline earth metal refers to beryllium, magnesium, calcium, strontium, barium, preferably calcium, strontium, barium, particularly preferably calcium and barium, unless expressly indicated otherwise.

It is still an objective to develop a heat transfer medium or heat storage medium which becomes solid (solidifies) at a relatively low temperature, thus has a low melting point, but has a high maximum long-term operating temperature (analogous to a high decomposition temperature).

For the present purposes, the maximum long-term operating temperature is the highest operating temperature for the heat transfer medium or heat storage medium at which the properties of the medium, for example viscosity, melting point, corrosion behavior, do not change significantly compared to the initial value over a long period of time, in general from 10 to 30 years.

Preference is given to using mixtures of sodium nitrate or potassium nitrate at relatively high temperatures. A routine long-term operating temperature range is from 290 to 565° C. Such mixtures have a relatively high melting point.

Mixtures of alkali metal nitrate and alkali metal nitrite usually have a lower melting point than the abovementioned nitrate mixtures, but also a lower decomposition temperature. Mixtures of alkali metal nitrate and alkali metal nitrite are usually employed in the temperature range from 150° C. to 450° C.

However, it is desirable, in particular for use in power stations for generating electric energy, e.g. solar thermal power stations, to increase the temperature of the heat transfer medium to far above 400° C., for example to far above 500° C., on arrival in the heat exchanger of the steam generator (known as steam inlet temperature) since the efficiency of the steam turbine is then increased.

It is thus desirable to increase the thermal stability of heat transfer media in long-term operation to, for example, more than about 565° C.

The chemical and physical properties of nitrate salt mixtures and nitrate/nitrite salt mixtures and thus, for example, their long-term operating temperature range in solar thermal power stations can change in an adverse manner in a number of ways, for example, when the abovementioned mixtures are subjected, in particular over a prolonged period of time, to comparatively high temperatures, for example above 565° C. in the case of nitrate salt mixtures and above 450° C. in the case of nitrate/nitrite salt mixtures. They generally then decompose into various degradation products.

This generally results in a decrease in the maximum long-term operating temperatures to below an economically and/or technically acceptable value and/or an increase in the melting point to above an economically and/or technically acceptable value. Furthermore, the decomposition of the mixtures mentioned usually also results in an increase in their corrosiveness.

Furthermore, the chemical and physical properties of nitrate salt mixtures and nitrate/nitrite salt mixtures and thus, for example, their long-term operating temperature range in solar thermal power stations can change in an adverse manner as a result of uptake of traces or even relatively large amounts of water or carbon dioxide, for example due to a leak in the heat transfer medium/steam heat exchanger or as a result of open operation in which the heat transfer media or heat storage media are in contact with the atmospheric moisture of the outside air.

The properties of the nitrate salt mixtures or nitrate/nitrite salt mixtures can in this way deteriorate to such an extent that they become unsuitable as heat transfer medium or heat storage medium and generally have to be replaced by fresh mixtures, which in the case of the huge amounts comprised in, for example, the piping and storage system of a solar thermal power station having multihour thermal stores is technically and economically disadvantageous or virtually impossible.

It was an object of the present invention to discover a method which avoids or reverses the deterioration of a heat transfer medium or heat storage mediums based on a nitrate salt mixture or a nitrate/nitrite salt mixture or widens the long-term operating temperature range of such mixtures.

A further object of the present invention was to discover a method which makes a nitrite salt-comprising heat transfer medium or heat storage medium suitable for higher long-term operating temperatures.

BRIEF SUMMARY OF THE INVENTION

We have accordingly found the method, process system, use and method of generating electric energy defined in the claims.

DETAILED DESCRIPTION OF THE INVENTION

For rationality reasons, the nitrate salt compositions defined in the description and in the claims, in particular their preferred and particularly preferred embodiment, will hereinafter also be referred to as "nitrate salt composition of the invention/according to the invention".

The nitrate salt composition of the invention is selected from the group consisting of alkali metal nitrate and alkaline earth metal nitrate and optionally alkali metal nitrite and alkaline earth metal nitrite as significant constituents.

A very useful embodiment of the nitrate salt composition of the invention comprises, as significant constituents, an alkali metal nitrate or an alkaline earth metal nitrate or a mixture of alkali metal nitrate and alkaline earth metal nitrate and in each case optionally an alkali metal nitrite or alkaline earth metal nitrite.

The alkali metal nitrate here is a nitrate of the metals lithium, sodium, potassium, rubidium or cesium, preferably lithium, sodium, potassium, particularly preferably sodium, potassium, generally described as $MetNO_3$, where Met represents the above-described alkali metals, which is preferably virtually water-free, particularly preferably free of water of crystallization, where the term alkali metal nitrate encompasses both a single nitrate and mixtures of the nitrates of these metals, for example potassium nitrate plus sodium nitrate.

The alkaline earth metal nitrate here is a nitrate of the metals magnesium, calcium, strontium, barium, preferably calcium, strontium, barium, particularly preferably calcium and barium, generally described as $Met(NO_3)_2$, where Met represents the above-described alkaline earth metals, which is preferably virtually water-free, particularly preferably free of water of crystallization, where the term alkaline earth metal nitrate encompasses both a single nitrate and mixtures of the nitrates of these metals, for example calcium nitrate plus magnesium nitrate.

The alkali metal nitrite here is a nitrite of the alkali metals lithium, sodium, potassium, rubidium and cesium, preferably lithium, sodium, potassium, particularly preferably sodium, potassium, generally described as $MetNO_2$, where Met represents the above-described alkali metals, which is preferably virtually water-free, particularly preferably free of water of crystallization. The alkali metal nitrite can be present as a single compound or as a mixture of various alkali metal nitrites, for example sodium nitrite plus potassium nitrite.

The alkaline earth metal nitrite here is a nitrite of the metals magnesium, calcium, strontium, barium, preferably calcium, strontium, barium, particularly preferably calcium and barium, generally described as $Met(NO_2)_2$, where Met represents the above-described alkaline earth metals, which is preferably virtually water-free, particularly preferably free of water of crystallization, where the term alkaline earth metal nitrite encompasses both a single nitrite and mixtures of the nitrites of these metals, for example calcium nitrite plus magnesium nitrite.

Preference is given to the following nitrate salt compositions according to the invention:

nitrate salt composition according to the invention comprising, as significant constituents, an alkali metal nitrate and/or alkaline earth metal nitrate and in each case optionally an alkali metal nitrite and/or alkaline earth metal nitrite;

nitrate salt composition according to the invention comprising, as significant constituents, an alkali metal nitrate selected from among sodium nitrate and potassium nitrate and in each case optionally an alkali metal nitrite and/or alkaline earth metal nitrite;

nitrate salt composition according to the invention comprising, as significant constituents, an alkali metal nitrate and optionally an alkali metal nitrite;

nitrate salt composition according to the invention comprising, as significant constituents, an alkali metal nitrate and optionally an alkali metal nitrite selected from among sodium nitrite and potassium nitrite;

nitrate salt composition according to the invention comprising, as significant constituents, an alkali metal nitrate selected from among sodium nitrate and potassium nitrate and in each case optionally an alkali metal nitrite selected from among sodium nitrite and potassium nitrite and/or an alkaline earth metal nitrite selected from among calcium nitrite and barium nitrite;

nitrate salt composition according to the invention comprising, as significant constituents, an alkali metal nitrate and/or alkaline earth metal nitrate;

nitrate salt composition according to the invention comprising, as significant constituents, an alkali metal nitrate selected from among sodium nitrate and potassium nitrate and/or an alkaline earth metal nitrate selected from among calcium nitrate and barium nitrate;

nitrate salt composition according to the invention comprising, as significant constituent, an alkali metal nitrate;

nitrate salt composition according to the invention comprising, as significant constituents, an alkali metal nitrate selected from among sodium nitrate and potassium nitrate.

Further very useful nitrate salt compositions according to the invention comprising, as significant constituents, an alkali metal nitrate selected from among sodium nitrate and potassium nitrate are, for example, the following:

potassium nitrate in an amount in the range from 20 to 55% by weight and sodium nitrate in an amount in the range from 45 to 80% by weight, in each case based on the mixture;

potassium nitrate in an amount in the range from 35 to 45% by weight, preferably 40% by weight, and sodium nitrate in an amount in the range from 55 to 65% by weight, preferably 60% by weight, in each case based on the mixture.

Further very useful nitrate salt compositions according to the invention comprising, as significant constituents, an alkali metal nitrate and optionally an alkali metal nitrite selected from among sodium nitrite and potassium nitrite are, for example, the following:

potassium nitrate in an amount in the range from 30 to 70% by weight, preferably from 50 to 60% by weight, and sodium nitrate in an amount in the range from 3 to 30% by weight, preferably from 5 to 10% by weight, and sodium nitrite in an amount in the range from 20 to 60% by weight, preferably from 35 to 45% by weight, in each case based on the mixture.

A mixture of potassium nitrate, sodium nitrate and sodium nitrite is also commercially available as the product Hitec® from Coastal Chemical Company LLC.

Further very useful nitrate salt compositions according to the invention comprising, as essential constituents, an alkali metal nitrate and optionally an alkaline earth metal nitrate are, for example, the following:

potassium nitrate in an amount in the range from 30 to 50% by weight, preferably from 35 to 45% by weight, and sodium nitrate in an amount in the range from 5 to 30% by weight, preferably from 10 to 20% by weight, and calcium nitrate in an amount in the range from 20 to 63% by weight, preferably from 35 to 45% by weight, in each case based on the mixture.

Apart from the abovementioned significant components, the nitrate salt composition of the invention can comprise traces of further constituents, for example oxides, chlorides, sulfates, carbonates, hydroxides, silicates of the alkali metals and/or alkaline earth metals, silicon dioxide, iron oxide, aluminum oxide or water. The sum of these constituents is generally not more than 1% by weight, based on the nitrate salt composition of the invention.

The sum of all constituents of the nitrate salt composition of the invention is 100% by weight.

The nitrate salt composition of the invention goes over into the molten and usually pumpable form at a temperature above about 100-300° C., depending, inter alia, on the nitrite content and the ratio of the cations forming the mixture.

The nitrate salt composition of the invention, preferably in molten form, for example as pumpable liquid, is used as heat transfer medium and/or heat storage medium, preferably in power stations for generating heat and/or electric energy, in chemical process technology, for example in salt bath reactors, and in metal hardening plants.

Examples of power stations for generating heat and/or electric energy are solar thermal power stations such as parabolic trough power stations, Fresnel power stations, tower power stations.

In a very useful embodiment, the nitrate salt compositions of the invention, preferably in the molten state, for example as pumpable liquid, are used both as heat transfer medium and as heat storage medium in the solar thermal power stations, for example in parabolic trough power stations, tower power stations or Fresnel power stations.

In a further very useful embodiment, the nitrate salt compositions of the invention, preferably in the molten state, for example as pumpable liquid, are used either as heat transfer medium or as heat storage medium in the solar thermal power stations, for example parabolic trough power stations, tower power stations, Fresnel power stations.

For example, the nitrate salt compositions of the invention, preferably in the molten state, for example as pumpable liquid, are used in tower power stations as heat transfer medium and/or as heat storage medium, particularly preferably as heat transfer medium.

When the nitrate salt compositions of the invention, preferably in the molten state, for example as pumpable liquid, are used as heat transfer medium in solar thermal power stations, for example parabolic trough power stations, tower power stations, Fresnel power stations, the heat transfer media are passed through tubes heated by solar radiation. They usually convey the heat arising there to a heat store or to the heat exchanger of the steam heater of a power station.

The heat store comprises, in one variant, a plurality of, usually two, large vessels, generally a cold vessel and a hot vessel (also referred to as "two-tank store"). The inventive nitrate salt composition, preferably in the molten state, for example as pumpable liquid, is usually taken from the cold vessel of the solar plant and heated in the solar field of a parabolic trough plant or a tower receiver. The hot molten salt mixture which has been heated in this way is usually introduced into the heated vessel and stored there until there is demand for generating electric energy.

Another variant of a heat store of the "thermoclinic store" comprises a tank in which the heat storage medium is stored in layers at different temperatures. This variant is also referred to as "layer store". When storage is carried out, material is taken from the cold region of the store. The material is heated and fed back into the hot region of the store for storage. The thermoclinic store is thus used in a manner largely analogous to a two-tank store.

The hot nitrate salt compositions of the invention in the molten state, for example as pumpable liquid, is usually taken from the hot tank or the hot region of the layer store and pumped to the steam generator of a steam power station. The steam produced there, which is at a pressure of above 100 bar, generally drives a turbine and a generator feeds electric energy to the electricity grid.

At the heat exchanger (salt/steam), the nitrate salt composition of the invention in the molten state, for example as pumpable liquid, is generally cooled to about 290° C. and usually conveyed back into the cold tank or the cold part of the layer store. When heat is transferred from the tubes heated by solar radiation to the store or to the steam generator, the nitrate salt composition of the invention in the molten form acts as heat transfer medium. Introduced into the heat storage vessel, the same nitrate salt composition of the invention acts as heat storage medium, for example to make it possible for electric energy to be generated according to demand.

However, the nitrate salt composition of the invention, preferably in molten form, is also used as heat transfer medium and/or heat storage medium, preferably heat transfer medium, in chemical process technology, for example for heating reaction apparatuses of chemical production plants, where a very high heat flow generally has to be transferred at very high temperatures with a small range of variation. Examples are salt bath reactors. Examples of the production plants mentioned are acrylic acid plants or plants for producing melamine, J. Alexander Jr. and S. G. Hindin, Industrial Engineering Chemistry 1947, 39, 1044-1049, describe the conversion of carbonate and hydroxide into a mixture of alkali metal nitrate and alkali metal nitrite by addition of nitric acid, but it is not disclosed that the conversion occurs in a reaction space comprising a partial amount of the mixture.

GB 545,590 describes, on page 7, lines 90 to 112, that 40 000 pounds per week are taken off from 1.5 million pounds of a mixture comprising 54% by weight of potassium nitrate (KNOB) and 46% by weight of sodium nitrite ($NaNO_2$) and also 0.8% of "alkali" in a tower, admixed with nitric acid having a concentration of 91.4% and the salt composition which has been treated in this way is recirculated to the "system". Furthermore, GB 545,590 states, on page 8, lines 17 to 65, that an atmosphere having an oxygen partial pressure lower than that in air should be used in vessels in which "salt" is stored. The treatment of a nitrate salt composition with an additive comprising the components nitric acid and/or nitrous acid and oxygen-comprising gas having an oxygen partial pressure which is equal to or greater than that in air and/or oxygen-generating compounds and optionally nitrogen oxides and/or further compounds which generate nitrogen oxide is not disclosed by GB 545,590.

The nitrate salt composition of the invention is brought into contact with an additive comprising nitric acid and/or nitrous acid and oxygen-comprising gas having an oxygen partial pressure which is equal to or greater than that in air and/or oxygen-generating compounds and optionally nitrogen oxides and/or compounds which generate further nitrogen oxide. This additive, in the following, is also referred to as "additive according to the invention".

For the present purposes, "oxygen-comprising gas" is pure elemental oxygen or oxygen-comprising gas mixtures having an oxygen partial pressure which is equal to or greater than that in air. Examples of "oxygen-comprising gas" are (i) air, (ii) mixtures of oxygen with other gases such as nitrogen or noble gases, where the proportion of oxygen, based on the gas mixture and measured at 1013.25 hPa and 20° C., is in the range from 22 to 99.9% by volume, and (iii) pure elemental oxygen ($O_2$).

For the following embodiments of the invention, the following proportions of oxygen in the oxygen-comprising gas are preferred:

(A) When the nitrate salt composition of the invention comprises a total proportion of 10% by weight or less of alkali metal nitrite and/or alkaline earth metal nitrite or virtually no alkali metal nitrite and/or alkaline earth metal nitrite, then the proportion of oxygen in the oxygen-comprising gas is preferably in the range from 60 to 99.9% by volume, particularly preferably in the range from 80 to 99.9% by volume, or the oxygen-comprising gas is pure elemental oxygen.

(B) When the nitrate salt composition of the invention comprises a total proportion of from >10% by weight to 50% by weight of alkali metal nitrite and/or alkaline earth metal nitrite, then the proportion of oxygen in the oxygen-comprising gas is preferably in the range from 22 to 40% by volume.

The respective acids nitric acid or nitrous acid are generally present as a solution of various concentrations in water.

The nitrate salt composition of the invention is here generally present in liquid, pumpable, in general molten, form.

The concentration of the nitric acid $HNO_3$ is usually in the range from 1 to 100% by weight, preferably from 50 to 100% by weight, particularly preferably from 60 to 90% by weight, of $HNO_3$ in water.

The concentration of the nitrous acid $HNO_2$ is usually in the range from 1 to 40% by weight of $HNO_2$.

Nitric acid and nitrous acid can be used either individually or in mixtures, with the mixing ratio not being considered to be critical. Apart from the nitric acid and/or nitrous acid, oxygen-comprising gas having an oxygen partial pressure which is equal to or greater than that in air and/or oxygen-generating compounds and optionally nitrogen oxides and/or compounds which generate nitrogen oxides are used.

Which nitrogen oxides are present depends on the boundary conditions such as pressure, temperature, presence or absence of oxygen.

Oxygen-generating compounds are all those which liberate elemental oxygen, for example as atomic oxygen, dioxygen or ozone, under the conditions at the place where the additive is added. Such compounds are, for example, inorganic or organic peroxides, for example sodium peroxide, potassium superoxide, dibenzoyl peroxide.

Compounds which generate nitrogen oxides are all those which liberate nitrogen oxides, for example dinitrogen monoxide, nitrogen monoxide, nitrogen dioxide, dinitrogen tetroxide, under the conditions at the place where the additive is added.

Preferred further components of the additives according to the invention, in addition to the nitric acid and/or nitrous acid, are oxygen-comprising gas having an oxygen partial pressure which is equal to or greater than that in air and/or oxygen-generating compounds and optionally the nitrogen oxides dinitrogen monoxide, nitrogen monoxide, nitrogen dioxide, dinitrogen tetroxide and compounds which generate these nitrogen oxides.

Further preferred components of the additives according to the invention, in addition to the nitric acid and/or nitrous acid, are oxygen-comprising gas having an oxygen partial pressure which is equal to or greater than that in air and optionally the nitrogen oxides nitrogen monoxide, nitrogen dioxide.

Particularly preferred further components of the additives according to the invention, in addition to the nitric acid and/or nitrous acid, are combinations of air or virtually pure elemental oxygen and nitrogen oxides, preferably nitrogen monoxide.

A further particularly preferred component of the additives according to the invention, in addition to the nitric acid and/or nitrous acid, is virtually pure elemental oxygen or air.

A particularly preferred additive according to the invention comprises nitric acid and an oxygen-comprising gas having an oxygen partial pressure which is equal to or greater than that in air, preferably air or virtually pure elemental oxygen, and also nitrogen oxides, preferably nitrogen dioxide and/or nitrogen monoxide.

A further particularly preferred additive according to the invention comprises nitric acid and an oxygen-comprising gas having an oxygen partial pressure which is equal to or greater than that in air, preferably air or virtually pure elemental oxygen but virtually no nitrogen oxides.

The contacting of the additive according to the invention with the nitrate salt composition according to the invention is generally effected by feeding in the additive according to the invention above or preferably below the surface of the nitrate salt composition according to the invention, which is usually present in liquid, pumpable, generally molten form.

In the contacting of the additive according to the invention with the nitrate salt composition according to the invention, the nitric acid is preferably uniformly distributed, which can be achieved, for example, by stirring or by means of a relatively long mixing section.

The contacting of the nitrate salt composition according to the invention with the additive according to the invention generally takes place in a suitable apparatus. This can be a vessel and/or a pipe through which the nitrate composition according to the invention flows or is present at rest therein or a subvolume of a vessel or of a pipe. The vessel or the pipe are preferably made of a material which is industrially resistant to nitric acid or nitrous acid.

The contacting of the nitrate salt composition according to the invention with the additive according to the invention generally takes place at a temperature just above, for example 50° C. above, the melting point of the nitrate salt composition according to the invention, usually in the range from 150 to 650° C., preferably at a temperature at which possible formation of dinitrogen monoxide ($N_2O$) is reduced or virtually completely suppressed.

The additive according to the invention can be added as complete mixture to the nitrate salt composition of the invention or in the form of the individual components or groups of individual components, in the two latter cases for example in succession.

For the following embodiments of the invention, the following variants of the contacting of the nitrate salt composition of the invention with the additive according to the invention are preferred:

When the nitrate salt composition of the invention comprises a total proportion of 10% by weight or less of alkali metal nitrite and/or alkaline earth metal nitrite or virtually no alkali metal nitrite and/or alkaline earth metal nitrite, then the proportion of oxygen in the oxygen-comprising gas is preferably in the range from 60 to 99.9% by volume, particularly preferably in the range from 80 to 99.9% by volume, or the oxygen-comprising gas is pure elemental oxygen and the above-described oxygen-comprising gas or the oxygen-comprising gas in the form of pure elemental oxygen is added to the above-described nitrate salt composition at a temperature in the range from 450 to 650° C. and, before and/or after this, the nitric acid and/or nitrous acid is added to the above-described nitrate salt composition at a temperature in the range from 150 to 350° C.

When the nitrate salt composition of the invention comprises a total proportion of from >10% by weight to 50% by weight of alkali metal nitrite and/or alkaline earth metal nitrite, then the proportion of oxygen in the oxygen-comprising gas is preferably in the range from 22 to 40% by volume and the additive according to the invention is added, preferably as complete mixture, to the above-described nitrate salt composition in the temperature range from 150 to 350° C. Particular preference is given to removing oxygen from the system again, for example by introduction of inert gas such as nitrogen, noble gases into or above the above-described nitrate salt composition after the point at which the additive according to the invention was added to the above-described nitrate salt composition.

The contacting of the nitrate salt composition according to the invention with the additive according to the invention generally occurs at a pressure which is selected so as to be sufficiently high for no significant outgassing of, for example, nitrogen oxides and/or water vapor and/or other gaseous components to occur. Appropriate pressures can, for example for nitric acid or water, be taken from relevant tables.

The contacting of the nitrate salt composition according to the invention with the additive according to the invention can be carried out continuously or discontinuously. Here, a continuous mode of operation means not only that the contacting occurs without interruption but also includes intermittent interruption. A discontinuous mode of operation is present, for example, when part of the nitrate salt composition according to the invention is introduced into a vessel, brought into contact there with the additive, optionally degassed and, for example, water is thus virtually completely or partly removed and the nitrate salt composition according to the invention is subsequently recirculated to the system.

In the contacting of the nitrate salt composition according to the invention with the additive according to the invention, water, inter alia, is usually introduced and/or formed into/in the nitrate salt composition according to the invention.

This water which has been introduced and/or formed is, in an embodiment of the invention, removed, optionally together with further volatile compounds, virtually completely or partly from the nitrate salt composition according to the invention which has been contacted with the additive. The water formed and/or introduced is preferably removed completely, i.e. to an extent of at least 99% by weight, from the nitrate salt composition according to the invention which has been contacted with the additive, but at least to such an extent that the water content of the nitrate salt composition according to the invention which has been contacted with the additive is not higher than that of the nitrate salt composition according to the invention immediately before contacting with the additive according to the invention.

The removal of the water which has been formed and/or introduced is preferably carried out at reduced pressure and elevated temperature compared to the contacting with the additive according to the invention. The pressure usually corresponds to the system pressure of the plant in which the nitrate salt composition according to the invention is present as heat transfer medium and/or heat storage medium, for example from 1 to 2 bar abs. The temperature usually corresponds to the maximum operating temperature of the plant in which the nitrate salt composition according to the invention is present as heat transfer medium and/or heat storage medium, for example a temperature in the range from 500 to 650° C.

In an embodiment, the removal of the water which has been formed and/or introduced or optionally further volatile compounds is carried out in a dedicated phase separator, for example a downstream vessel.

The nitrate salt composition according to the invention which has been treated by removal of the water which has been formed and/or introduced or optionally further volatile compounds is usually recirculated to the system in which the major part of the nitrate salt composition according to the invention is present as heat transfer medium and/or heat storage medium. The water vapor is preferably condensed, optionally together with nitrogen oxides, and removed from the system.

In a further embodiment ("parallel embodiment") of the invention, the additive according to the invention is fed into a vessel located in parallel to the major part of the nitrate salt composition according to the invention in molten form, for example a mixture of sodium nitrate and potassium nitrate in molten form, and into/from which a partial amount of the nitrate salt composition according to the invention is introduced and/or discharged either discontinuously or preferably continuously. All embodiments described in the preceding passages for contacting of the additive according to the invention with the nitrate salt composition according to the invention also apply expressly to the "parallel embodiment" described here.

In an embodiment of the process of the invention, the nitrate salt composition according to the invention can be taken off from a very low position in the system in which the major part of the nitrate salt composition according to the invention is present as heat transfer medium and/or heat storage medium, for example at the bottom of the cold storage tank. The bottom of the storage tank can, for example, be provided with a purpose-made depression into which an offtake lance projects down to the bottom or just above.

The introduction of the additive according to the invention into a vessel connected in parallel to the main stream of the flowing nitrate salt composition according to the invention has the advantage that, regardless of the respective operating pressure of the main stream, a different, advantageously higher, pressure and/or a different temperature can be selected in the vessel connected in parallel, which usually results in a faster reaction and therefore a higher degree of regeneration of the nitrate salt mixture according to the invention.

The nitrate salt composition according to the invention which has been treated in this way can subsequently be freed of dispersed components, for example metal oxides, by filtration and is then recirculated to the heat transfer medium circuit.

Very useful embodiments of the above-described "parallel vessel embodiment" of the invention are described below by way of example for a solar thermal power station and are shown schematically in FIG. 2.

Figure 2A:
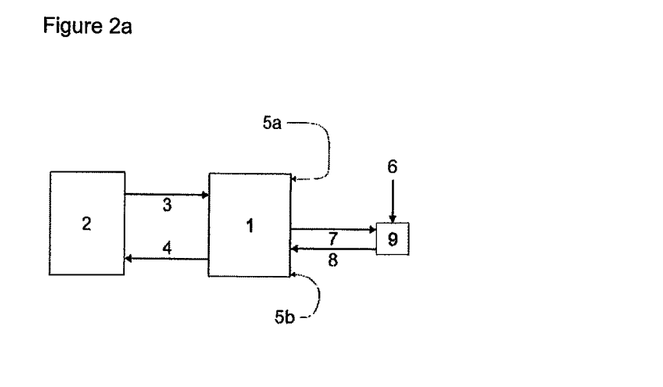
FIG. 2a shows introduction into the heat storage system in a "parallel vessel embodiment" of the invention.

Here,

FIG. 2a shows the introduction into the heat storage system

Figure 2B:
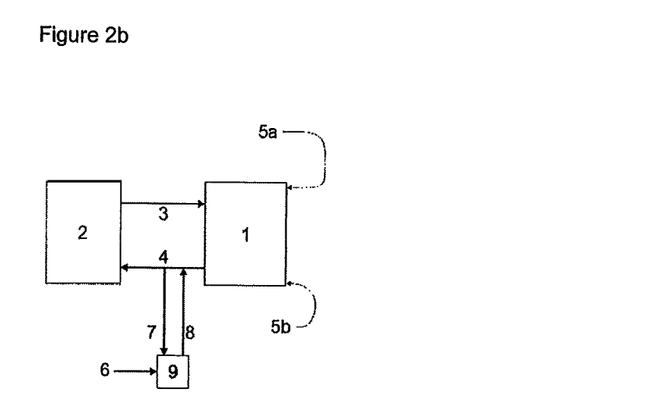
FIG. 2b shows introduction into the stream of a cold heat transfer medium in a "parallel vessel embodiment" of the invention.

FIG. 2b shows the introduction into the stream of a cold heat transfer medium.

In FIG. 2, the numerals have the following meanings.

1 Heat storage system
2 Receiver system
3 Stream of a heated heat transfer medium according to the invention

4 Stream of a cold heat transfer medium according to the invention

5a Hot region of the heat storage system

5b Cold region of the heat storage system

6 Introduction of an additive according to the invention

7 Taking off of a substream of the heat transfer medium according to the invention

8 Recirculation of the substream of the heat transfer medium according to the invention

9 External reaction vessel

Two variants showing how contacting of the nitrate salt mixture of the invention with an additive according to the invention can be configured for a solar thermal power station (see FIG. 1) are outlined by way of example in FIG. 2. All the variants have a receiver system (2) which exchanges a heat transfer/storage medium with a heat storage system (1) via the lines (3) and (4). The heat storage system (1) has a hot region (5a) and a cold region (5b). In the one variant (FIG. 2a), the substream is, by way of example, taken from a middle temperature region of the heat storage system. Taking it from the cold region of the storage system is likewise possible. In the second variant (FIG. 2b), it is taken from the cold main stream (4) of heat transfer medium.

The branching-off of the substream of the nitrate salt composition of the invention is carried out, for example, by pumping. After the substream has been taken off, it is contacted with the additive according to the invention in a separate reaction vessel. Turbulence, which improves the mixing of the additive with the nitrate salt composition, can be brought about in the reaction vessel by stirring or by means of various internals. The reaction vessel can be set by conventional means to a different, preferably higher pressure and/or an altered temperature compared to the offtake temperature in order to achieve, for example, a higher degree of regeneration of the nitrate salt mixture of the invention.

The amount of the additive according to the invention which is brought into contact with the nitrate salt composition of the invention depends on the technical problem to be solved and can be determined by a person skilled in the art using conventional methods for determining the composition of the nitrate salt composition which is to be brought into contact with the additive according to the invention.

Examples of these methods are analytical methods such as determination of the basicity, determination of the nitrite and/or nitrate content of the nitrate salt composition which is brought into contact with the additive according to the invention.

In a useful embodiment, for example well-suited to solar thermal power stations, the basicity of the nitrate salt composition according to the invention which is to be brought into contact with the additive according to the invention is determined, for example, by acid-based titration or potentiometrically. This determination can be carried out in-line, on-line or off-line. On the basis of the basicity value determined in this way, the amount of the additive according to the invention is determined and introduced, leading to complete neutralization of the nitrate salt composition according to the invention. Preferably this produces a small residual basicity, as defined below, in the nitrate salt composition according to the invention.

For the present purposes, the alkalinity (basicity) is the specific amount of acid equivalents which an aqueous solution of a salt melt can take up until it reaches pH neutrality. The sensor parameter "alkalinity" can be measured in-line, on-line or off-line. The target value of "alkalinity" should be 0.001 to 5%, preferably 0.005 to 1% and particularly preferably 0.01 to 0.5%. Instead of measuring the alkalinity by means of titration, a substitute sensor parameter can also be employed after appropriate calibration. Substituted parameters can be: density, optical parameters (spectrum), etc.

The present patent application also provides a process system as defined in the claims.

For the purposes of the present invention, such a system is made up of vessels, for example reservoirs such as tanks, in particular heat storage tanks, and/or apparatuses, for example apparatuses for pumping fluids (for example salt melts), e.g. pumps, which are connected by pipes and effect transport and/or storage of thermal energy by means of heat transfer media or heat storage media, for example the primary circuit for heat transfer media and/or heat storage media in solar thermal power stations.

Examples of such pipes are those which are located on the focal line of the parabolic trough mirrors or Fresnel mirrors in solar thermal power stations and/or which form the receiver tubes or receiver tube bundles in solar thermal tower power stations and/or those which, for example in solar thermal power stations, connect particular apparatuses to one another without having the function of collecting solar radiation.

A further example of a process system as defined in the claims is salt bath reactors of chemical process technology and systems formed by connecting them, which in each case comprise the nitrate salt composition of the invention. The latter is brought into contact with an additive as defined herein.

The present patent application also provides for the use of an additive as defined in the claims for maintaining or widening the long-term operating temperature range of a heat transfer medium and/or heat storage medium comprising a nitrate salt composition as defined in the claims.

For the present purposes, an additive is that which has been described in more detail above and is also described herein as additive according to the invention, including all preferred embodiments. A nitrate salt composition is, for the present purposes, that which has been described in more detail above and is also referred to herein as nitrate salt composition of the invention/according to the invention, including all preferred embodiments.

The abovementioned use preferably relates to a heat transfer medium and/or heat storage medium in a) power stations for generating heat and/or electricity, particularly preferably solar thermal power stations, in particular those of the parabolic trough power station, Fresnel power station or tower power station type, b) in chemical process technology, particularly preferably salt bath reactors, or c) in metal hardening plants.

The present patent application also provides a method of generating electric energy in a solar thermal power station using a nitrate salt composition, as defined in the claims, as heat transfer medium and/or heat storage medium, where the nitrate salt composition is brought into contact with an additive as defined in the claims.

For the present purposes, an additive is what has been described in more detail above and is also described herein as additive according to the invention, including all preferred embodiments. A nitrate salt composition is, for the present purposes, that which has been described in more detail above and is also referred to herein as nitrate salt composition of the invention/according to the invention, including all preferred embodiments.

The abovementioned method preferably relates to a heat transfer medium and/or heat storage medium in solar thermal power stations of the parabolic trough power station, Fresnel power station or tower power station type.

The invention claimed is:

1. A method of maintaining or widening the long-term operating temperature range of a heat transfer medium and/or heat storage medium comprising a nitrate salt composition selected from the group consisting of alkali metal nitrate, alkaline earth metal nitrate, and combinations thereof, and optionally alkali metal nitrite and alkaline earth metal nitrite, the process comprising:
   bringing the nitrate salt composition into contact with an additive comprising nitric acid and nitrous acid and oxygen-comprising gas selected from the group consisting of air, pure elemental oxygen, and mixtures of oxygen with other gases where the proportion of oxygen, based on the gas mixture and measured at 1013.25 hPa and 20° C. is in the range from 22 to 99.9% by volume, and optionally nitrogen oxides and/or compounds which generate further nitrogen oxide;
   wherein the contacting results in complete neutralization of the nitrate salt composition or setting of a residual basicity in the nitrate salt composition.

2. The method according to claim 1, wherein the contacting of the additive with the nitrate salt composition occurs in a reaction space which comprises a partial amount of the heat transfer medium.

3. The method according to claim 2, wherein at least a portion of the heat transfer medium is present in a main stream and the reaction space is arranged in parallel to the main stream.

4. The method according to claim 1, wherein the method further comprises completely or partly removing water which has either been introduced via the additive contacted with the nitrate salt composition or has been formed in the method.

5. The method according to claim 1, wherein the heat transfer medium and/or heat storage medium is used in power stations for generating heat and/or electricity, in chemical process technology or in metal hardening plants.

6. The method according to claim 5, wherein the power stations for generating heat and/or electricity are solar thermal power stations.

7. The method according to claim 6, wherein the solar thermal power stations are of the parabolic trough power station, Fresnel power station or tower power station type.

8. The method according to claim 1, wherein the nitrate salt composition is taken off from the bottom of a cold part of a heat storage system.

9. A process system in which pipes and vessels and/or apparatuses are connected and in which a heat transfer medium and/or heat storage medium comprising the nitrate salt composition defined in claim 1 is present, wherein the nitrate salt composition is brought into contact with the additive as defined in claim 1.

10. A power station for generating heat and/or electricity, a chemical plant or a metal hardening plant comprising the process system according to claim 9.

11. The power station according to claim 10, wherein the plant for generating heat and/or electricity is a solar thermal power station.

12. The method according to claim 1, wherein the heat transfer medium and/or heat storage medium comprises alkali metal nitrite or alkaline earth metal nitrite.

13. The method according to claim 1, wherein the additive comprises nitrogen oxides and/or compounds which generate further nitrogen oxide.

14. A method of generating electric energy in a solar thermal power station comprising:
   heating a heat transfer medium by solar radiation;
   exchanging heat with water in a heat exchanger; and
   driving a generator to generate electric energy;
   wherein the heat transfer medium is a nitrate salt composition selected from the group consisting of alkali metal nitrate, alkaline earth metal nitrate, and combinations thereof, and wherein all or part of the nitrate salt composition is brought into contact with an additive comprising nitric acid and nitrous acid and oxygen-comprising gas selected from the group consisting of air, pure elemental oxygen, and mixtures of oxygen with other gases where the proportion of oxygen, based on the gas mixture and measured at 1013.25 hPa and 20° C. is in the range from 22 to 99.9% by volume;
   wherein the contacting results in complete neutralization of the nitrate salt composition or setting of a residual basicity in the nitrate salt composition.

* * * * *